(12) United States Patent
Bruff

(10) Patent No.: X791
(45) Date of Patent: Jul. 24, 1807

(54) WINDOW CLEANING/WINDOW CLEANER

(76) Inventor: Thomas Bruff

Thomas Bruff
Letters Patent

The Schedule refered to in these Letters Patent and making part
of the same, containing a description in the words of the said
Thomas Bruff himself of his apparatus for & mode of cleaning windows.

This apparatus consists of two Brushes and a large Syringe
the first Brush with a short curved handle of sheet iron, for the
purpose of making it thin and a little elastic. This brush
has a thin back and the length of the bristles are adapted
to the thickness of the sash, being designed to clean a part
of the top row of glass in the lower sash and on the out
side next the top. The other Brush has larger bristles formed
a little like a white washer's brush, but stiffer and stands
horizontally to the glass. it has a short handle with a
ferril of sheet iron at the end, not brazed, but left
open to spring and to receive another handle to elevate it to
the top of the upper sash, and will apply as well to the inside
as out, and in the same way. The syringe differs from others
in size and contains two or three quarts of water. also in the
length and form of its pipe which is about three feet long turn
ing a little backward near the end so as to cast the water with
force to the top or any part of the window by applying it against
the breast. It has handles to the sides to draw it by, and a broad
knob at the top of the staff to rest against the breast in applying
it ——

Witnesses
William Thornton
Benj^n. Connor

Thomas Bruff

286 [illegible]

(Patented 21^st July 1807)